United States Patent
Carlyle et al.

(10) Patent No.: US 12,099,998 B2
(45) Date of Patent: *Sep. 24, 2024

(54) CONFIGURABLE, REACTIVE ARCHITECTURE FRAMEWORK FOR DATA STREAM MANIPULATION AT SCALE

(71) Applicant: JPMorgan Chase Bank, N.A., New York, NY (US)

(72) Inventors: Jason Carlyle, Chicago, IL (US); Nicholas P. Stumpos, Chicago, IL (US); Jaspreet Singh Sethi, Naperville, IL (US)

(73) Assignee: JPMorgan Chase Bank, N.A., New York, NY (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/739,993

(22) Filed: May 9, 2022

(65) Prior Publication Data

US 2022/0261796 A1    Aug. 18, 2022

Related U.S. Application Data

(63) Continuation of application No. 16/253,955, filed on Jan. 22, 2019, now Pat. No. 11,354,661.

(51) Int. Cl.
  *G06Q 20/38* (2012.01)
(52) U.S. Cl.
  CPC ................... *G06Q 20/389* (2013.01)
(58) Field of Classification Search
  CPC .................................................. G06Q 20/389
  USPC .......................................................... 705/39
  See application file for complete search history.

(56) References Cited

U.S. PATENT DOCUMENTS

| 10,956,179 B1* | 3/2021 | Moturu .............. G06F 3/04817 |
| 2003/0004746 A1 | 1/2003 | Kheirolomoom et al. |
| 2009/0192922 A1* | 7/2009 | Hahn-Carlson ........ G06Q 20/40 705/40 |

(Continued)

FOREIGN PATENT DOCUMENTS

| CA | 3168344 A1 * | 1/2019 | ........... G06F 3/0482 |
| WO | 2014/078241 | 5/2014 | |

OTHER PUBLICATIONS

1. Authors: Jun-Chao Lu; Title: A secure negotiable on-demand services model for cloud environment; Pub: IEEE; Date Added to IEEE Xplore: Jun. 23, 2011 (Year: 2011).*

(Continued)

*Primary Examiner* — Bruce I Ebersman
*Assistant Examiner* — Hatem M Ali
(74) *Attorney, Agent, or Firm* — Greenblum & Bernstein, P.L.C.

(57) ABSTRACT

Various methods, apparatuses, and media for processing a transaction are provided. A request to process the transaction is received. The request includes a plurality of pieces of transaction data. An initial contract is identified, based on at least a first piece of the transaction data, and loaded. The initial contract includes a plurality of mono-services, with each of the mono-services being a function literal that includes a defined input and output and being configured to implement exactly one piece of functionality. The initial contract is executed, with the mono-services being configured to return a result for responding to the request to process the transaction.

16 Claims, 10 Drawing Sheets

(56) References Cited

U.S. PATENT DOCUMENTS

| | | | |
|---|---|---|---|
| 2014/0172952 A1 | 6/2014 | Varney et al. | |
| 2014/0365247 A1* | 12/2014 | Mariyal | G06Q 20/22 705/4 |
| 2015/0019428 A1 | 1/2015 | Priebatsch | |
| 2017/0193466 A1 | 7/2017 | Clark | |
| 2017/0344991 A1 | 11/2017 | Mark et al. | |
| 2020/0005295 A1* | 1/2020 | Murphy | G06Q 20/405 |

OTHER PUBLICATIONS

2. Authors: Kanchana Rajaram; Title: Dynamic generation of transactional contracts for hierarchical workflows; Pub: IEEE; Date Added to IEEE Xplore: Jun. 8, 2017 (Year: 2017).*

Authors: Jun-Chao Lu; Title: A secure negotiable on-demand services model for cloud environment; Pub: IEEE; Date Added to IEEE Xplore: Jun. 23, 2011 (Year: 2011).*

Authors: Kanchana Rajaram; Title: Dynamic generation of transactional contracts for hierarchical workflows; Pub: IEEE; Date Added to IEEE Xplore: Jun. 8, 2017 (Year: 2017).*

International Search Report and Written Opinion of the International Searching Authority in International Patent Appl. No. PCT/US2020/014596, dated May 14, 2020.

Ocariza, "On the Detection, Localization and Repair of Client-Side JavaScript Faults," The University of British Columbia, Oct. 2016, [retrieved on Mar. 27, 2020], Retrieved from the Internet: <URL:https://open.library.ubc.ca/cIRcle/collections/ubctheses/24/items-/1.0319058> pp. 1-100.

Authors: Jinyue Song et al.: Smart Contract-based Computing Resources Trading in Edge Computing: 8 p. 9 figures, to appear in the 2020 Annual IEEE International Symposium on Personal, Indoor and Mobile Radio Communications (IEEE PIMRC 2020) (Year: 2020).

Authors: Fariba Ghaffari et al.: A Novel Access Control Method Via Smart Contracts for Internet-Based Service Provisioning:; Published in: IEEE Access (vol. 9, pp. 81253-81273); Publication Date: Jan. 1, 2021 (Year: 2021).

* cited by examiner

CONFIGURABLE, REACTIVE ARCHITECTURE FRAMEWORK FOR DATA STREAM MANIPULATION AT SCALE

CROSS REFERENCE TO RELATED APPLICATIONS

This is a continuation of U.S. patent application Ser. No. 16/253,955, filed Jan. 22, 2019. The entire disclosure of the above-identified document, including the specification, drawings, and claims, is incorporated herein by reference in its entirety.

BACKGROUND

1. Field of the Disclosure

This disclosure generally relates to transaction processing, and, more particularly, to methods, apparatuses, systems, media, and platforms for high volume, low latency, and reactive transaction processing.

2. Background Information

Transaction processing, and especially electronic transaction processing, has become an integral part of daily life. Customers swipe their electronic cards, or initiate other forms of electronic payment via touch, proximity, image capture, etc., and the transaction is completed in what appears to be a simple process. Behind every transaction, however, is an elaborate and complex procedure. Initiating the transaction and receiving a receipt when the transaction is complete are only the first and last steps of such elaborate and complex procedure.

The frequency with which electronic transactions are initiated and completed will likely continue to increase.

SUMMARY

The present disclosure, through one or more of its various aspects, embodiments, and/or specific features or sub-components, provides, inter alia, various systems, servers, devices, methods, media, programs, and platforms for processing a transaction. The various aspects, embodiments, features, and/or sub-components provide a technological solution that relies upon a framework which uses extremely fast transaction and data stream processing based on configurable, small, easily testable units of code. The transaction and data stream processing may be executed according to rules sourced from a merchant services participant domain and/or contract providers. The embodiments and processes described herein are aimed at being thin, fast, and location agnostic for speeding up transaction processing and improving developers' abilities to deliver business value into a content management system modernization architecture.

According to an embodiment of the present disclosure, a non-transitory computer-readable medium including an executable computer program for processing a transaction is provided. The executable computer program, when executed by a processor, causes the processor to perform operations. The operations include receiving a request to process the transaction and identifying, from the request, a plurality of pieces of transaction data. Based on at least a first piece of the plurality of pieces of transaction data and from among a plurality of contract providers, a contract provider that is configured to process the transaction is determined. Based on the contract provider and from among a plurality of contracts, a contract is loaded. The contract includes at least one mono-service. The contract, including the at least one mono-service, is executed. In this regard, each of the at least one mono-service is a function literal that includes a defined input and output. The input includes at least one of the plurality of pieces of transaction data. Moreover, the at least one mono-service is configured to return a result of the processing of the transaction.

According to another aspect of the present disclosure, each of the at least one mono-service is configured to implement exactly one piece of functionality.

According to yet another aspect of the present disclosure, the contract includes a plurality of mono-services, and the plurality of mono-services is configured to execute in a predefined sequence.

According to a further aspect of the present disclosure, independent ones of the plurality of mono-services are configured to execute concurrently.

According to still a further another aspect of the present disclosure, the contract consists essentially of the plurality of mono-services.

According to another aspect of the present disclosure, each of the plurality of mono-services is an actor in an actor system and is addressable.

According to yet another aspect of the present disclosure, the at least one mono-service is configured to side effect.

According to a further aspect of the present disclosure, the operations further receive, in response to the contract being executed, the result. In this regard, the result is received via a communication network.

According to still a further another aspect of the present disclosure, the communication network is a credit card network. In this regard, the at least one mono-service calls a credit card authorization entry point on the credit card network and returns the result via the credit card network.

According to another aspect of the present disclosure, the request to process the transaction is received from a merchant device. The operations further transmit the result to the merchant device.

According to yet another aspect of the present disclosure, the operations determine whether a plurality of contract providers is configured to process the transaction in parallel.

According to a further aspect of the present disclosure, a plurality of requests to process a plurality of transactions is received. Each of the plurality of contract providers is configured to process at least one of the plurality of transactions A plurality of contracts is loaded for processing the plurality of transactions based on the plurality of contract providers. The plurality of contracts is executed for processing the plurality of transactions. Moreover, for each of the plurality of requests, a same process is implemented to arrive at execution of one of the plurality of contracts.

According to still a further another aspect of the present disclosure, the operations further determine, based on the contract provider and from among a plurality of contracts, whether an additional contract is to be loaded and executed. The additional contract further includes at least one mono-service.

According to another aspect of the present disclosure, the contract provider is determined based only on the first piece of the plurality of pieces of transaction data.

According to yet another aspect of the present disclosure, the contract is loaded based on a second piece of the plurality of pieces of transaction data, with the first piece being different than the second piece.

According to a further aspect of the present disclosure, the first piece of the plurality of pieces of transaction data includes a method of payment, and the second piece of the plurality of pieces of transaction data includes a merchant or a location of the merchant.

According to still a further another aspect of the present disclosure, the first piece of the plurality of pieces of transaction data includes a method of payment, and the second piece of the plurality of pieces of transaction data includes an amount of the transaction.

According to another aspect of the present disclosure, each of the at least one mono-service is implemented via functional programming, and the plurality of pieces of transaction data includes a method of payment, a payment number, a merchant, and a location.

According to another embodiment of the present disclosure, a system for processing a transaction is provided. The system includes a processor and a memory. The memory stores instructions that, when executed by the processor, cause the processor to perform operations. The operations include receiving a request to process the transaction and identifying, from the request, a plurality of pieces of transaction data. Based on at least a first piece of the plurality of pieces of transaction data and from among a plurality of contract providers, a contract provider that is configured to process the transaction is determined. Based on the contract provider and from among a plurality of contracts, a contract is loaded. The contract includes at least one mono-service. The contract, including the at least one mono-service, is executed. In this regard, each of the at least one mono-service is a function literal that includes a defined input and output. The input includes at least one of the plurality of pieces of transaction data. Moreover, the at least one mono-service is configured to return a result of the processing of the transaction.

According to a further embodiment of the present disclosure, a method for—processing a transaction is provided. The method receives a request to process the transaction and identifies, from the request, a plurality of pieces of transaction data. Based on at least a first piece of the plurality of pieces of transaction data and from among a plurality of contract providers, a contract provider that is configured to process the transaction is determined. Based on the contract provider and from among a plurality of contracts, a contract is loaded. The contract includes at least one mono-service. The contract, including the at least one mono-service, is executed. In this regard, each of the at least one mono-service is a function literal that includes a defined input and output. The input includes at least one of the plurality of pieces of transaction data. Moreover, the at least one mono-service is configured to return a result of the processing of the transaction.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

Figure 1:
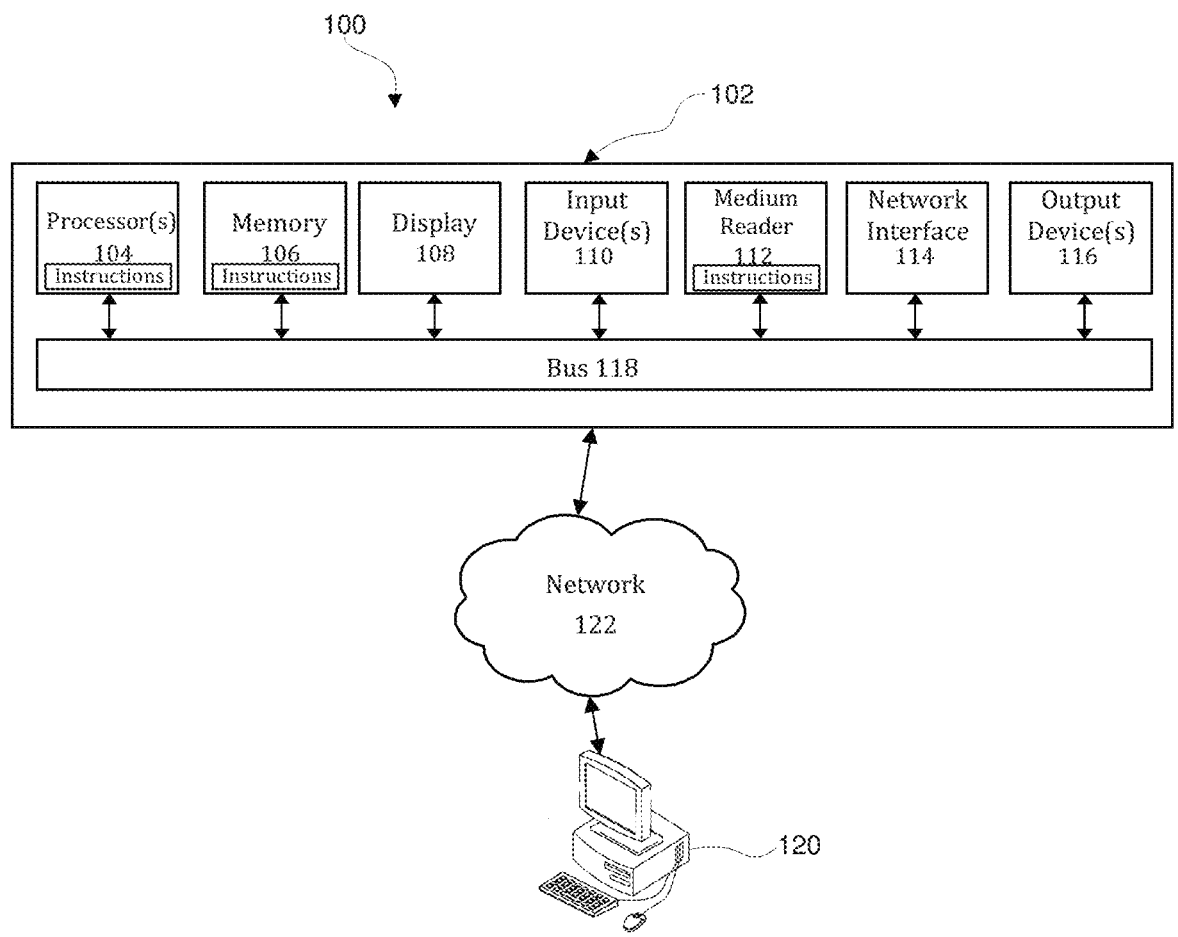
FIG. 1 illustrates an exemplary computer system for processing a transaction in a network environment, according to an aspect of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, a security camera, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limiting embodiment, implementations can include distributed processing, component/object distributed processing, and parallel processing. Virtual computer system processing can be constructed to implement one or more of the methods or functionality as described herein, and a processor described herein may be used to support a virtual processing environment.

Figure 2:
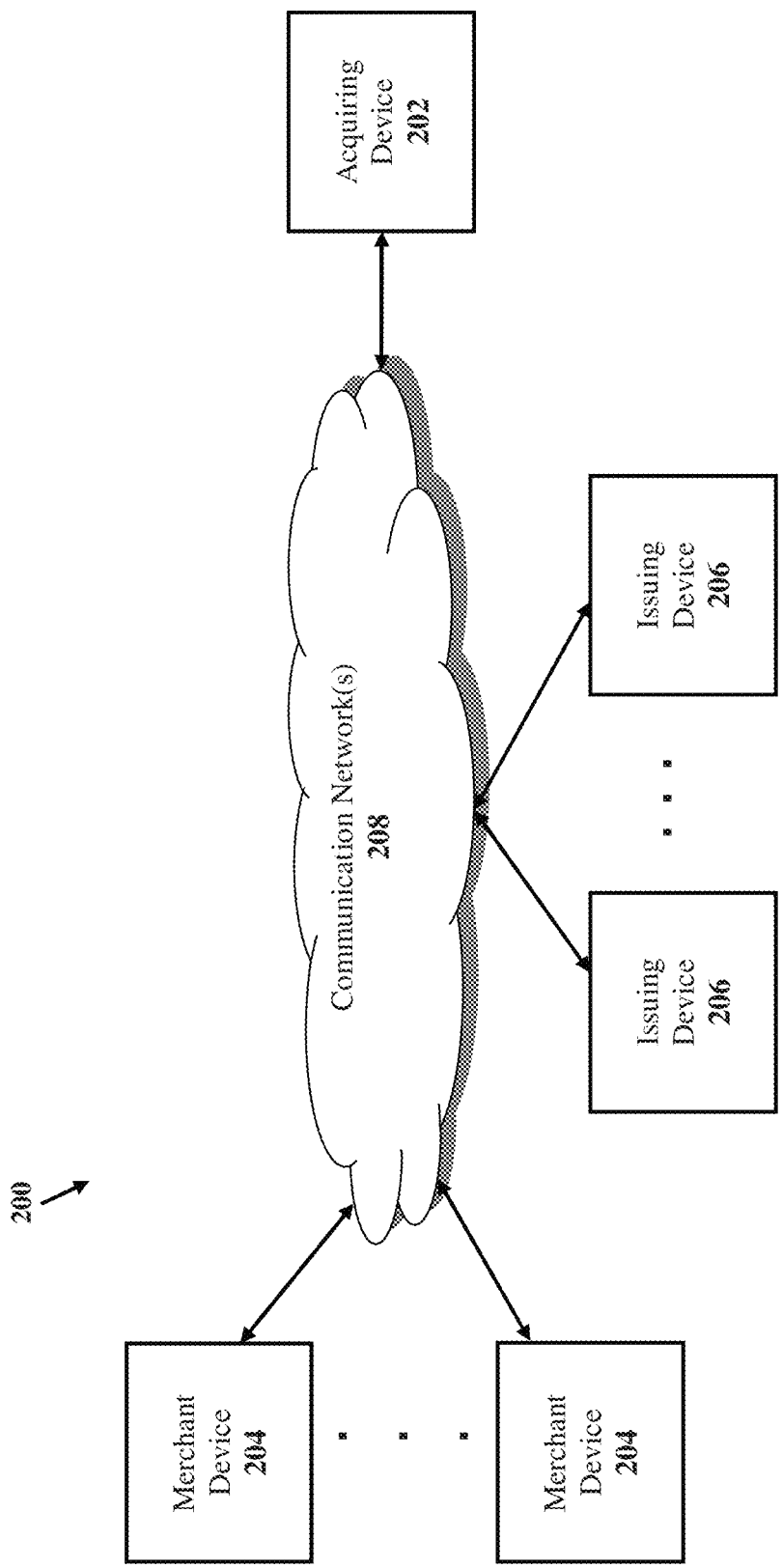
FIG. 2 illustrates an exemplary network environment for processing a transaction, according to an aspect of the present disclosure.

Referring to FIG. 2, a schematic of a system 200, deployed in an exemplary network environment, for processing a transaction is generally shown. The transaction is generally discussed and described herein as being a financial transaction and, more specifically, a credit card transaction. Nevertheless, it should be known and understood that these types of transactions are merely exemplary and are used for convenience. For example, the financial transaction may additionally or alternatively include contactless transactions, touch-to-pay transactions, digital or electronic transactions, and/or any additional types of transactions. Also, in further embodiments, the transaction may additionally or alternatively include any additional or alternative types of transactions besides financial transactions without departing from the scope of the present disclosure.

In the system 200 of FIG. 2, an acquiring device 202 is shown as facilitating transactions between merchant devices 204 and issuing devices 206 via one or more communication network(s) 208.

The acquiring device 202 may be the same or similar to the computer system 102 as described with respect to FIG. 1, including any features or combination of features described with respect thereto. The term "device" as used herein should not be limiting. That is, the acquiring device 202 may be a singular device or comprised of multiple devices. Also, it may include any device, server, terminal, system, platform, medium, program, entity, or combination thereof as understood in the art. As an entity, the acquiring device 202 may be, for example, any national, regional, state, federal, government, quasi-government, government-sponsored, public, private, or other entity. With respect to the non-limiting and exemplary embodiments regarding the transaction being a financial or credit card transaction, the entity may be a bank or other financial institution, or any component, agent, or representative thereof.

The merchant devices 204 may also each be the same or similar to the computer system 102 as described with respect to FIG. 1, including any features or combination of features described with respect thereto. The merchant devices 204 are also not meant to be limited by the term "device", as described in the preceding paragraph. Further, while the system 200 of FIG. 2 shows two merchant devices 204, any number of merchant devices 204 may be included within the system 200 without departing from the scope of the present disclosure. The merchant devices 204 may be independent of or affiliated with the acquiring device 202. For example, the merchant devices 204 may be an extension of the acquiring device 202 which allow merchants to accept transactions and send transaction details to the acquiring device 202 and/or the issuing devices 206. In this regard, the merchant devices 204 may include any device or other entity which is able to initiate a transaction, financial or otherwise, as generally known and understood in the art.

The merchant devices 204 may comprise or be associated with physical devices or locations. Additionally or alternatively, the merchant devices 204 may be intangible and/or associated with electronic locations. For example, the merchant devices 204 may comprise non-transitory media which are accessible via online, electric, or other network environments. Again, the merchant devices 204 may include any device or other entity which is able to initiate a transaction, financial or otherwise, as generally known and understood in the art.

The issuing devices 206 may also each be the same or similar to the computer system 102 as described with respect to FIG. 1, including any features or combination of features described with respect thereto. The issuing devices 206 are also not meant to be limited by the term "device", as described in the previous paragraphs. Further, while the system 200 of FIG. 2 shows two issuing devices 206, any number of issuing devices 206 may be included within the system 200 without departing from the scope of the present disclosure.

In certain embodiments, the issuing devices 206 may be specific to certain types of transactions and/or transactions originating from certain locations. That is, the issuing devices 206 may each relate to a different type of transaction and/or transactions originating from certain locations, or the issuing devices 206 may relate to the same types of transactions and/or transactions originating from the same locations. In a specific embodiment, the issuing devices 206 may include financial institutions that issue types of payments accepted by the merchant devices 204 in the transactions which are initiated by the merchant devices 204. Nevertheless, while the issuing devices 206 are described as "issuing" devices, it is to be known and understood that they need not necessarily issue the types of payments or other goods and/or services which may be a part of the transactions. The issuing devices 206 may receive the transactions, or information thereof, from the merchant devices 204 via the acquiring device 202 and the communication network(s) 208.

The one or more communication network(s) 208 may be the same or similar to the network 122 as described with respect to FIG. 1. In this regard, the communication network(s) 208 may employ any suitable interface mechanisms and network communication technologies as generally understood. Furthermore, the communication network(s) 208 may comprise or be associated with an association or other group of entities. For example, in embodiments of the present disclosure, the communication network(s) 208 may comprise or be operated by entities that process transactions locally, regionally, domestically, globally, or based on any additional or alternative geographic or electronic area. In a specific example, the communication network(s) 208 may include a credit card network that is operated by entities that process credit card or other payments for or without interchange fees. In any event, the above-described examples are not limiting or exhaustive. The communication network(s) 208 may include any singular or group of networks, wired or wireless, which facilitate the processing of transactions that are initiated by the merchant devices 204 and provided to the issuing devices 206 via the acquiring device 202.

Figure 3:
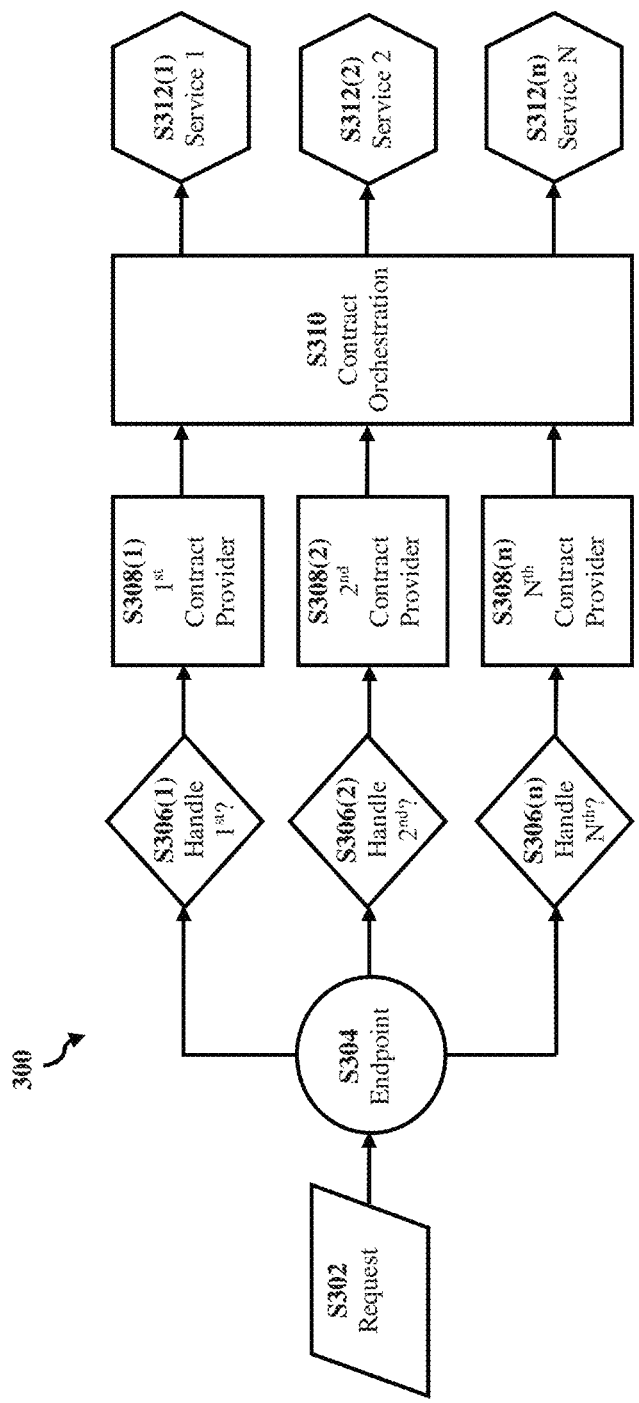
FIG. 3 illustrates an exemplary workflow of a process for processing a transaction, according to an aspect of the present disclosure.

An exemplary workflow of a process for processing a transaction initiated by one of the merchant devices 204 is generally shown in FIG. 3 at 300. The process 300 may be implemented wholly or in part by, for example, the acquiring device 202. The process generally relates to the acquiring device 202 receiving a request to process a transaction from one of the merchant devices 204. The acquiring device 202 may process the transaction, as will be described herein, and forward the transaction to one of the issuing devices 206 for at least one of authorization, authentication, confirmation, clearing, and settlement. The acquiring device 202 may receive the authorization, the authentication, the confirmation, the clearing, and/or the settlement from the one of the issuing devices 206, and forward a reply to the merchant device 204 which initiated the request for processing of the transaction. The transmission, receipt, and forwarding of information amongst the merchant device 204, the acquiring device 202, and the issuing device 206 may be via the communication network(s) 208.

As will be apparent from the description herein, the process 300 may provide for high volume, low latency, transaction processing. For example, the process 300 may achieve greater than 10,000 transactions per second (TPS) with less than 40 milliseconds (ms) round-trip time (RTT). Of course, these achievements and values are non-limiting and merely exemplary. Nevertheless, the process 300 achieves the benchmarks by developing component pieces individually and recombining them in different ways depending on the data included in each transaction.

The process 300 comprises a framework that is built upon reactive programming principles. The reactive programming principles may include, but are not limited to: responsiveness; resiliency; elasticity; and being message driven.

With respect to being responsive, the process 300 responds in a timely manner if at all possible. Responsiveness may be the cornerstone of usability and utility but, more than that, responsiveness may mean that problems may be detected quickly and dealt with effectively. Responsive processes, components, and/or systems may focus on providing rapid and consistent response times, and also establishing reliable upper bounds so they deliver a consistent quality of service. Such consistent behavior in turn may simplify error handling, build end user confidence, and encourage further interaction.

With respect to being resilient, the process 300 may stay responsive in the face of failure. This may apply not only to highly-available, mission critical processes, components, and/or systems, as any process, component, and/or system that is not resilient may be unresponsive after a failure. Resilience may be achieved by replication, containment, isolation, and delegation. Failures may be contained within each process, component, or system. Isolating processes, components, and/or systems from each other may thereby ensure that parts of the system may fail and recover without compromising the processes, components, and/or systems as a whole. Recovery of each process, component, and/or system may be delegated to another, external or internal, process, component, and/or system to ensure high-availability by replication where necessary. In this regard, the client of a process, component, and/or system may not be burdened with handling failure(s) of the process, component, and/or system.

With respect to being elastic, the process 300 may stay responsive under varying workload. That is, reactive processes, systems, and/or components may react to changes in the input rate by increasing and/or decreasing the resources allocated to service inputs. This may imply designs that have no contention points or central bottlenecks, resulting in the ability to shard and/or replicate processes, components, and/or systems and distribute inputs amongst them. Reactive processes, systems, and/or components may support predictive, as well as reactive, scaling algorithms by providing relevant live performance measures. The reactive processes, systems, and/or components may be able to achieve elasticity in a cost-effective way on commodity hardware and software platforms.

With respect to being message driven, the process 300 may include reactive processes, systems, and/or components that rely on asynchronous message-passing to establish a boundary between components that ensures loose coupling, isolation, and location transparency. The boundary may also provide the means to delegate failures as messages. Employing explicit message-passing may enable load management, elasticity, and flow control by shaping and monitoring the message queues in the system and applying back-pressure when necessary. Location transparent messaging as a means of communication may make it possible for the management of failure to work with the same constructs and semantics across a cluster or within a single host. Non-blocking communication may allow recipients to only consume resources while active, leading to a decrease in process, system, and/or component overhead.

Of course, those skilled in the art will appreciate that the above-described principles and advantageous are merely exemplary and are not limiting, required, nor exhaustive. The process 300, as well as any of the additional or alternative embodiments described herein, may provide additional or alternative principles, advantageous, and/or benefits consistent with the disclosure herein and as would be apparent to one skilled in the art. For example, the process 300, as well as any of the additional or alternative embodiments described herein, may further be maintainable and/or extensible.

In the process 300 shown in FIG. 3, a request to process a transaction may be initiated at S302. The request may be initiated at, for example, one of the merchant devices 204 of FIG. 2.

The request may comprise a data stream and include transaction information. Nevertheless, it should be known and understood that the format or type of the request is not limiting and that different formats and types of the request may be used without departing from the scope of the present disclosure.

The transaction information may comprise any information which pertains to the transaction. For example, in embodiments in which the transaction includes a financial transaction, the transaction information may include a method of payment, a payment type, payer identification information, a payment number, a payment expiration date, a security code, a payer address, payee identification information, a payee address, a payment amount, a payment acquirer or processor, a payment network, a payment issuer, and/or any additional or alternative information which is generally known and understood in the art. In the specific non-limiting and exemplary embodiment in which the transaction is for a credit card transaction process, the transaction information may include any combination of a method of payment, a credit card number, a credit card expiration date, a billing address, a card security code, a payment amount, payee identification information, a payee address, an acquiring bank or processor, a credit card network, and an issuing bank. The card security code may be, for example, a card verification value (CVV), a card verification value 2 (CVV2), a Card Validation Code 2 (CVC2), a Card Identification Number (CID), etc. Of course, the above-described examples are merely exemplary and are not limiting or exhaustive. The transaction information may relate to any type of transaction which is generally known and understood in the art and include any type(s) of information which are also generally known and understood in the art without departing from the scope of the present disclosure.

The request to process the transaction, including the transaction information, may be transmitted to an entrypoint or an endpoint at S304. The entrypoint or the endpoint may be, for example, a connection point of the acquiring device 202 of FIG. 2 to the communication network(s) 208. In this regard, the request to process the transaction may be transmitted from one of the merchant devices 204 to the acquiring device 202 via the communication network(s) 208 at S304.

Upon receipt of the request to process the transaction at the endpoint at S304, the acquiring device 202 may reformat, reconfigure, parse, or otherwise change a format of the request. That is, the transaction information included within the request may be changed in format, for example, such that a plurality of pieces of transaction data included therein are identified by the acquiring device 202. The plurality of pieces of transaction data may correspond to the above-described types of transaction information, as well as to any additional or alternative types of information which are generally known and understood.

The process 300 provides the above-described non-limiting and advantageous effects by realizing that processing rules of transactions may differ based on the participants and/or pieces of transaction data included within the transactions. In other words, the processing rules may differ for different contract providers that handle the transactions and also for different types of transactions. The contract providers may relate to the entities that operate the communication network(s) 208. For example, when the communication network(s) 208 includes a credit card network, the contract providers may relate to the entities that process credit card or other payments for or without interchange fees. Additionally or alternatively, the contract providers may relate to the issuing devices 206 as described with respect to FIG. 2 or any additional or alternative participant to a transaction as generally known and understood.

Accordingly, in a financial or credit card transaction, the rules may differ based on a method of payment and/or the contract provider which handles the transaction. Nevertheless, while the processing rules may differ, an overall flow or process for processing the transactions may be the same regardless of the different processing rules for the different types of transactions and/or the different contract providers. As a result, as generally shown in FIG. 3, the overall flow or process for processing transactions of different types and/or for different contract providers may be orchestrated in a common manner if business logic is encapsulated correctly.

In view of the above, the process 300 may, for example, orchestrate different mono-services for each type of transaction and/or for each contract provider. A mono-service, as used herein, is a function literal that has a defined input and output which may or may not have a side effect. The mono-services may be implemented at an edge of a customer, merchant, or other entity interaction interface. That is, the mono-services may be implemented at an edge of an interaction interface between the acquiring device 202 and the merchant devices 204, between the acquiring device 202 and the contract providers, and/or between the acquiring device 202 and the issuing devices 206.

The mono-services may be implemented via functional programming such that they avoid changes in state and mutable data. They may be implemented by, for example, any functional programming language which is generally known and understood in the art. In additional embodiments of the present disclosure, the mono-services need not necessarily be limited to functional programming. The mono-services may be implemented by, for example, object-oriented programming or a combination of object-oriented programming and functional programming. In embodiments including such combination, the mono-services may be implemented by Scala, which does not prevent side effects and mutable state. In any event, the above-described examples are merely exemplary and the mono-services may be implemented in accordance with any additional or alternative methods which are generally known and understood.

The mono-services, or function literals, may be Java components that are able to be run on a Java virtual machine (JVM). While FIG. 3 shows that a single mono-service is orchestrated for each type of transaction and/or contract provider, it should be known and understood that plural mono-services may also be orchestrated for different types of transactions and/or contract providers. The at least one mono-service that is orchestrated for each different type of transaction and/or contract provider may be implemented by a contract. The contracts, for the different types of transactions and/or contract providers, may be defined either at compile or run-time. Thus, each contract may be a predefined set of at least one mono-service that is derived from or defined by the transaction participants, such as the merchant devices 204, the contract providers, and/or the issuing devices 206.

At S306(1) . . . (n) of FIG. 3, the process 300 determines, from among a plurality of contract providers, at least one contract provider which is configured to handle or process the transaction. A contract provider which is configured to handle or process the transaction may be determined from a single piece of transaction data, or from plural pieces of transaction data. Further, the contract providers may be given a property bag including any combination of the pieces of transaction data, such that the contract providers may be able to determine whether they are able to execute or process the transaction based on the property bag. In this regard, the property bag may be, for example, a JavaScript Object Notation (JSON) object. The JSON object may include the pieces of transaction data as inputs, as well as results of executing or processing the transaction. Of course, the above-described examples are merely exemplary and not limiting. Any additional types of inputs and objects may be used for determining whether a contract provider is able to handle or process a transaction.

The process 300 may determine whether the contract providers are able to handle or process the transaction in series. Alternatively, as shown in FIG. 3, it may be determined whether plural contract providers are able to handle or process the transaction in parallel. In such case, the contract providers may need to be registered in advance. Nevertheless, the process 300 would allow for scaling. That is, contract providers may be added to the process 300 at S306(1) . . . (n) of FIG. 3 without increasing latency. If a contract provider can execute or otherwise process the transaction based on the property bag or other transaction data, the contract provider could proceed to execute or process the transaction. Otherwise, the contract provider wouldn't.

Thus, upon determining a contract provider that is configured to execute or process the transaction at S306(1) . . . (n) of FIG. 3, the contract may be identified, specified, determined, or otherwise loaded at S308(1) . . . (n). The contract may be determined from among a plurality of contracts at S306(1) . . . (n). In this regard, the contract may be determined using the same piece or pieces of transaction data which were used to determine that the contract provider may handle or process the transaction, or the contract may be determined using a different piece or pieces of transaction data than used to determine that the contract provider may handle or process the transaction. The same and/or different piece or pieces of transaction data may be included within the above-mentioned property bag or otherwise provided. In a non-limiting and exemplary embodiment of the process 300, for example, the contract provider may be determined using a method of payment of the transaction. Thereafter, the contract may be determined using a merchant, merchant type, merchant location, or other location of the transaction. Accordingly, while a same contract provider may handle different transactions which use a same method of payment, different contracts may be identified for transactions from different locations and/or different merchants.

In additional or alternative embodiments, the contract may be identified at S308(1) . . . (n) using additional or alternative pieces of transaction data, which may or may not be included in the property bag. For example, the contract may be determined in accordance with an amount of the transaction. In this regard, contracts may include different mono-services for different levels of authentication or security. Of course, the above-described examples are merely exemplary and the contracts and manners in which they are identified may be determined in accordance with any additional or alternative processes without departing from the scope of the present disclosure. Those skilled in the art will appreciate that the specific contract may be chosen at S308(1) . . . (n) based on any values or information in the transaction or request.

As discussed above, the contract includes at least one mono-service, which may or may not be dependent upon the different locations, different merchants, and/or different transaction values. The mono-service is a function literal that includes a defined input and output for a single entry point. The contract may include plural mono-services that are to be executed in sequence or in another predefined order. In this regard, independent mono-services may be executed in parallel or concurrently. The mono-services may accept, as inputs, any combination of the pieces of transaction data from the transaction or from the property bag. Each mono-service may implement exactly one piece of functionality. The mono-services may further use an actor system in which they are addressable. In any event, the mono-service(s) may be called in any predefined or otherwise determined sequence or workflow based on the specified contract to execute on or against any values, information, or other data in the transaction or request for processing of the transaction. Further, the contract may consist essentially of mono-services. That is, any of the functions intended to be implemented by the contract, or during processing of the transaction, may be defined within a mono-service. This allows the demanding, conventionally non-functional requirements for authorization to be met at scale while also providing the reactive, non-limiting and advantageous effects described above.

The specified or loaded contract is orchestrated or otherwise executed at S310 of FIG. 3, whereupon the at least one mono-service specified by the contract is executed or otherwise run at S312(1) . . . (n). The contract and/or the at least one mono-service may further provide a result of processing the transaction at S312(1) . . . (n). For example, according to a non-limiting and exemplary embodiment, a mono-service, or mono-services, may take the property bag with all of the pieces of transaction data necessary to call a credit card authorization entry point and return the result. Additionally or alternatively, a mono-service may be validating data included in the transaction and/or transforming the data in part or in whole. In any event, each of the at least one mono-service may be a function which takes certain entry data, performs a function of the transaction processing, and responds with its output.

The output may be used by, for example, the acquiring device 202 of FIG. 2 to authenticate, verify, confirm, execute, record, or otherwise process the transaction. Additionally or alternatively, the acquiring device 202 may pass or otherwise transmit any result of the contract or the at least one mono-service, which is executed or otherwise run at S312(1) . . . (n), to the one of the merchant devices 204 which requested processing of the transaction.

Accordingly, the process 300 of FIG. 3 provides a reactive programming framework that allows for real-time data stream processing via data stream input selection. The framework creates small functions and chains them together with a reactive framework, such that demanding and conventionally non-functional requirements for authorizations at web scale may be met. Such framework provides many capabilities and advantages when it comes to versioning processing pipelines, rolling out changes, rolling back changes, and testing individual functions. Of course, these capabilities and advantages are merely exemplary and are not limiting or exhaustive. Additional and alternative capabilities and advantages should be apparent to one of ordinary skill in the art in consideration of the disclosure in total.

Figure 4:
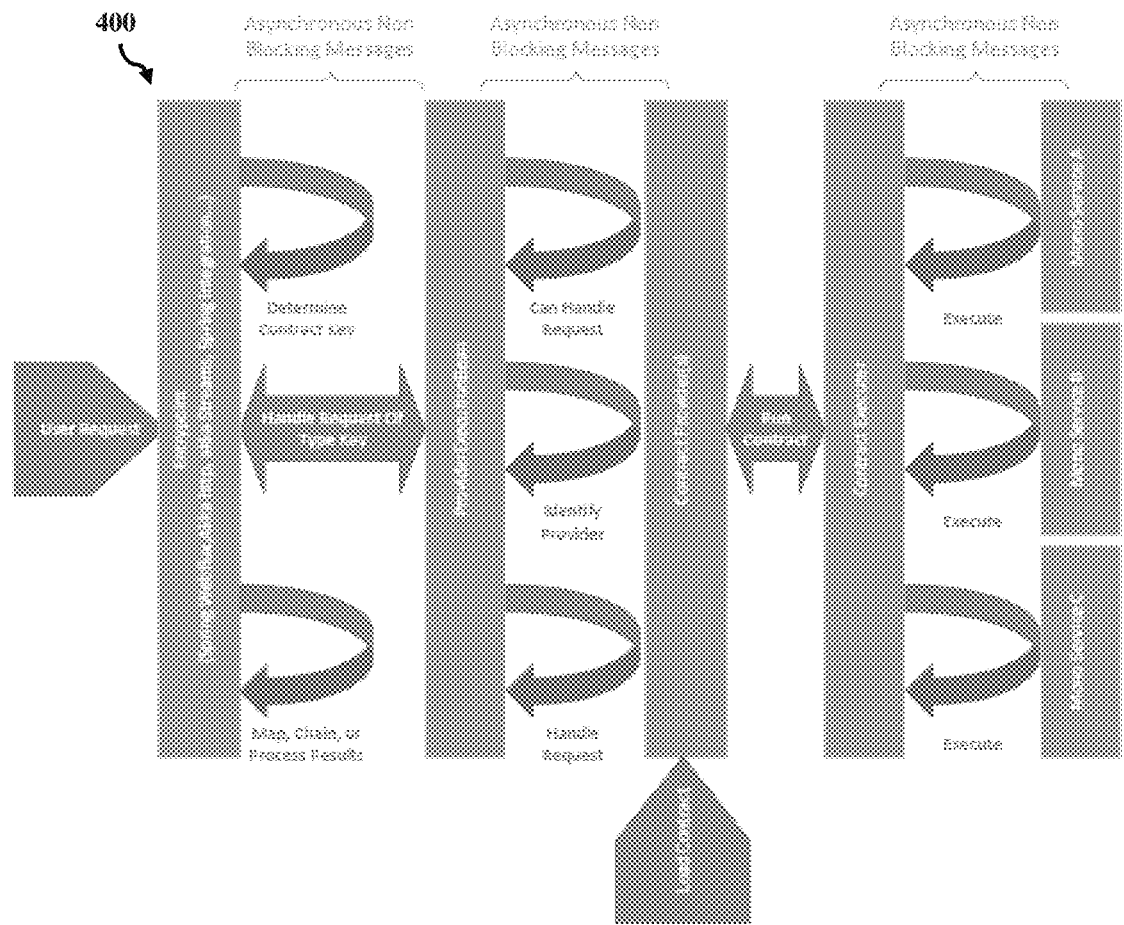
FIG. 4 illustrates an additional exemplary workflow of a process for processing a transaction, according to an aspect of the present disclosure.

A further exemplary workflow of a process for processing a transaction is generally shown at 400 in FIG. 4. In the process 400, a user or merchant request for processing a transaction is received. The user or merchant request may be received from, for example, the merchant device 204. The user or merchant request may be received at an entrypoint or an endpoint of, for example, the acquiring device 202. The user or merchant request may be received via any application programming interface such as, for example, Spring Webflux, Akka http, akka Streams, Spring Integration, etc. Of course, these examples are merely exemplary and any additional programming model or interface may be used for receiving the user or merchant request.

The user or merchant request is mapped, chained, or otherwise processed to determine transaction data or a contract key reflective of the type of transaction. An asynchronous non-blocking message is transmitted to a ProviderExecutionBean, which transmits further asynchronous non-blocking messages to contract provider(s) to identify a provider that can handle a request. Upon identification of the provider that can handle the request, a contract is loaded and run by a Contract Executer. The Contract Executer causes any mono-services specified by the contract to be executed via further asynchronous non-blocking messages.

Figure 5:
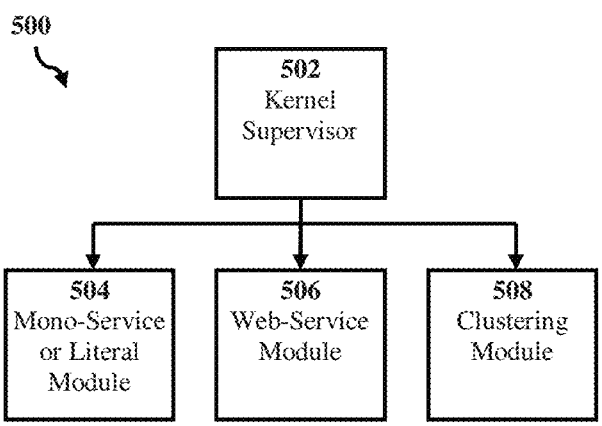
FIG. 5 illustrates an exemplary framework for implementing a process for processing a transaction, according to an aspect of the present disclosure.

An exemplary framework for implementing the process 300 of FIG. 3 and/or the process 400 of FIG. 4 is generally shown at 500 in FIG. 5. The framework 500 includes a Kernel Supervisor 502, a Mono-Service or Literal Module 504, a Web-Service Module 506, and a Clustering Module 508. The Kernel Supervisor 502 may be necessary for use of the framework 500. The Mono-Service or Literal Module 504 may handle the execution of mono-service contracts, and thus, the specific mono-services or literals that are orchestrated therein. The Web Module 506 may provide routing, via HyperText Transfer Protocol (HTTP) or other protocol, for mono-service executions. The Cluster Module 508 may be built on Akka Cluster and allow for the discovery, connection, and use of mono-services that are registered to cartridges, such that access to new mono-services may be allowed.

Figure 6:
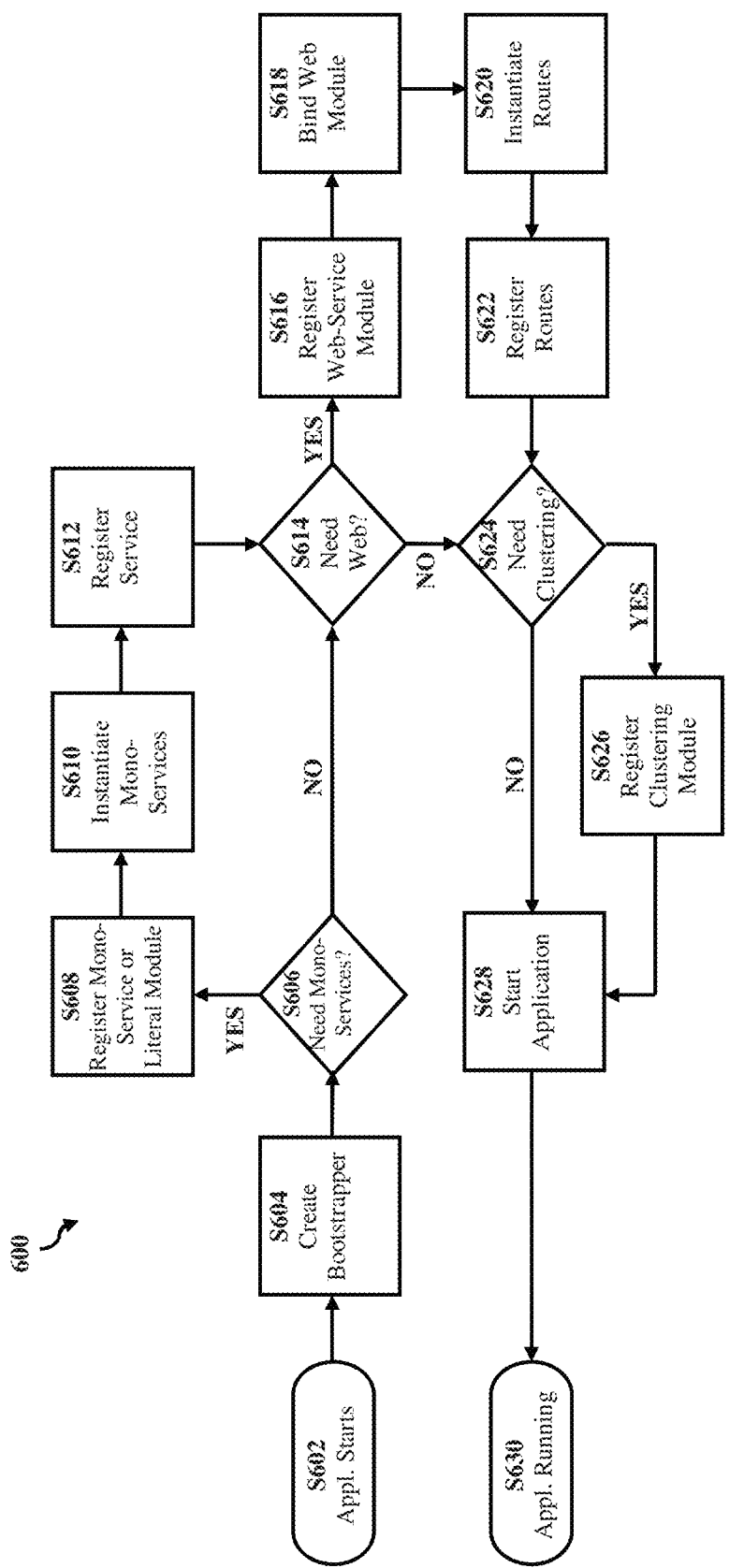
FIG. 6 illustrates an exemplary process of a Kernel Supervisor, as included in a framework for implementing a process for processing a transaction, according to an aspect of the present disclosure.

An exemplary embodiment of a process of the Kernel Supervisor 502 is generally shown at 600 in FIG. 6. According to the process 600, an application for processing a transaction is started at S602. A bootstrapper is created at S604 to prepare or otherwise configure the application at S604.

At S606 of the process 600, it is determined whether any mono-services need to be registered. If mono-services need to be registered, the Mono-Service or Literal Module 504 may be registered at S608, the mono-services may be instantiated at S610, and the mono-services may be registered at S612. The Mono-Service or Literal Module 504 will be described hereinafter with respect to FIG. 8. If it is determined that mono-services do not need to be registered at S606 of the process 600, the process 600 may skip S608-S612.

At S614 of the process 600, it is determined whether any web-services need to be registered. If web-services need to be registered, the Web-Service Module 506 may be registered at S616, the Web-Service Module 506 may be bound at S618, any routes may be instantiated at S620, and the routes may be registered at S622. The Web-Service Module 506 may be implemented in accordance with any procedures which are generally known and understood in the art. If it is determined that web-services do not need to be registered at S614 of the process 600, the process 600 may skip S616-S622.

At S624 of the process 600, it is determined whether clustering is needed. If clustering is needed, the Clustering Module 508 is registered at S626. The Clustering Module 508 may also be implemented in accordance with any procedures which are generally known and understood in the art. If it is determined that clustering is not needed at S624 of the process 600, the process 600 may skip S626.

Thereafter, the application is started at S628 of the process 600, and the application is running at S630 such that transactions may be processed according to the processes, procedures, and methods described herein.

Figure 7:
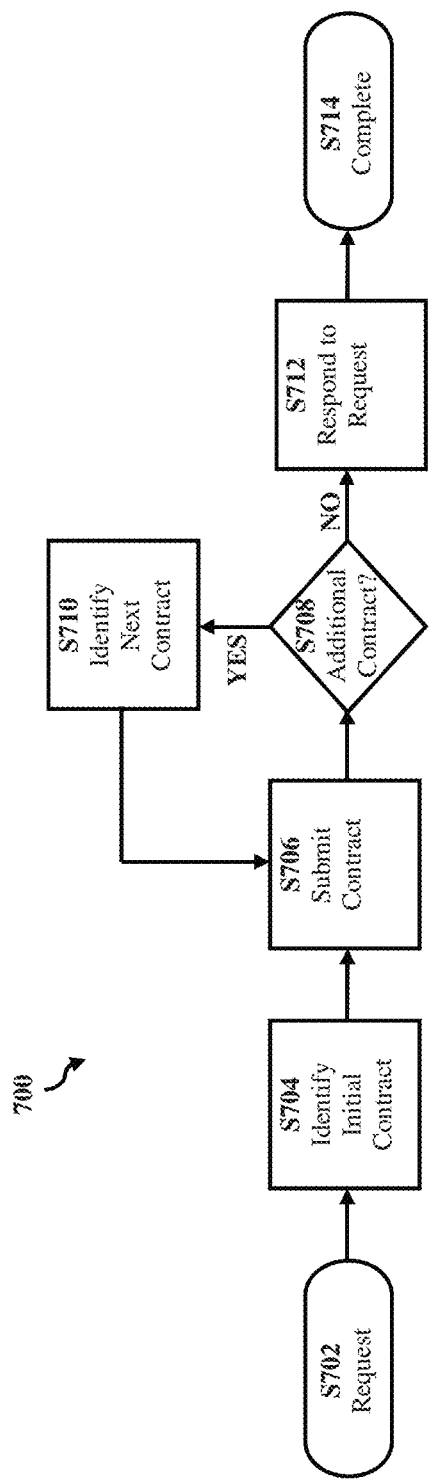
FIG. 7 illustrates an exemplary process of an application, in a running state, for processing a transaction, according to an aspect of the present disclosure.

An exemplary embodiment of a process of the application in a running state and for processing a transaction, as in S630 of the process 600 of FIG. 6, is generally shown at 700 in FIG. 7.

According to the process 700, the application receives a request for processing a transaction at S702. An initial contract is identified at S704. The initial contract may be the same or similar to the specified contract as described with respect to S308(1) . . . (n) of FIG. 3. The initial contract may be submitted for orchestration or execution at S706, in a same or similar manner as described with respect to S310 of FIG. 3.

Thereafter, according to the process 700 of FIG. 7, it may be determined whether an additional contract is required or specified at S708. If an additional contract is required or specified, the additional contract may be identified, specified, or otherwise determined at S710 and submitted for orchestration or execution at S706. If an additional contract is not required or specified at S708, the application responds to the request for processing the transaction at S712. The application may respond to a user or merchant which originated the request at S702 based on result(s) of the submitted contract(s) at S706 or based on any additional result(s) of processing the transaction. The user or merchant may be, for example, one of the merchant devices 204 of FIG. 2. After responding to the request at S712, the process 700 for processing the transaction is completed at S714.

Figure 8:
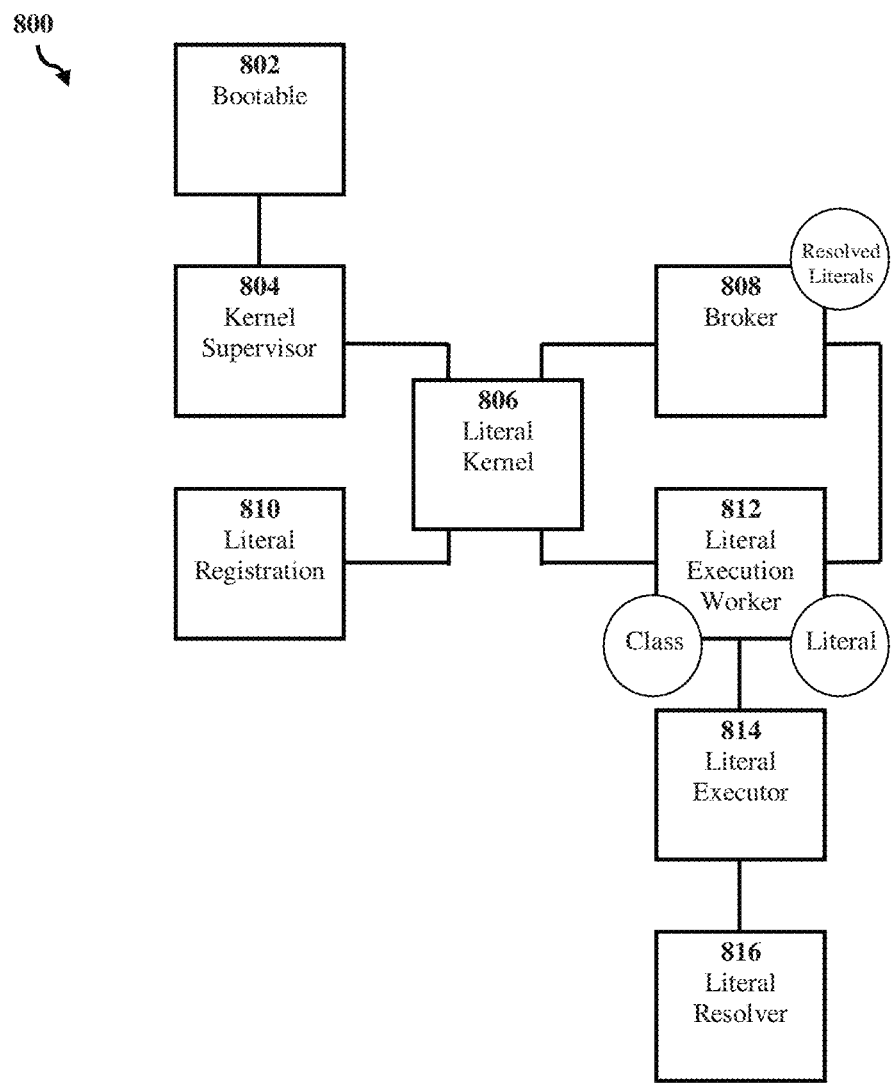
FIG. 8 illustrates an exemplary embodiment of a workflow for a Mono-Service or Literal Module, according to an aspect of the present disclosure.

An exemplary embodiment of a workflow for the Mono-Service or Literal Module 508 is generally shown at 800 in FIG. 8. As discussed above, the Mono-Service or Literal Module 508 handles execution of mono-services or mono-service contracts.

The Bootable 802 is a booter that begins configuration and discovery, starts the actor system service, and initializes the Kernel Supervisor 804. The Literal Kernel 806 is an actor that updates a registered literal or mono-service list for Broker 808, and initializes the Broker 808. The Literal Registration 810 may be a Scala class that registers a method and sends an Ask to register the Kernel Supervisor 804 with the Literal Kernel 806 and sends a message to initialize the brokers of each registered child kernel so they can start routing to the correct Literal Execution Worker 812. The Literal Execution Worker 812 is an ActorRef assigned to handle a specific literal, gets appended to registered literals list, and assigned to id (name & version). The Literal Executor 814 executes the literals, and the Literal Resolver 816 is a Java class that resolves the literal's annotated methods.

Figure 9:
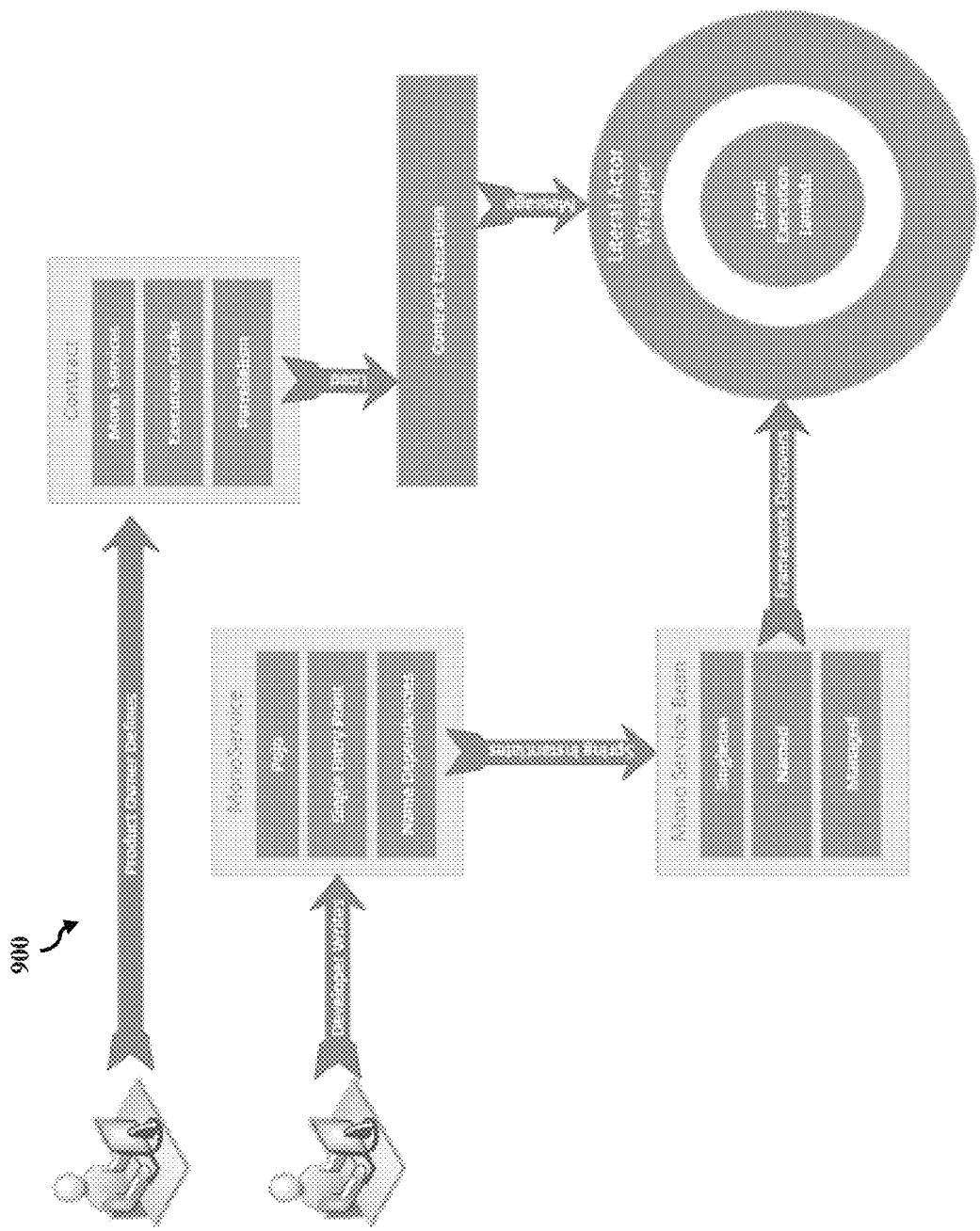
FIG. 9 illustrates an exemplary embodiment of a process for using the framework, according to an aspect of the present disclosure.

An exemplary embodiment of a process for using the framework 500 is generally shown at 900 in FIG. 9. According to the process 900, a developer may write a mono-service as generally described herein. The mono-service may be a plain old Java object (POJO) with a single entry point. The mono-service may further allow for name dependencies. The mono-service may be initiated by, for example, Spring to create a mono-service bean. The mono-service bean may be a singleton, named, and managed. The mono-service bean may be discovered by the framework 500.

Concurrently or separately, a product owner may define a contract. The contract may include any number of mono-services as described herein. The contract may further specify an execution order of the mono-services, and allow for parallelism. The contract may be loaded and executed. Upon execution, a message may be transmit that, in combination with the mono-service bean being discovered by the framework 500, defines a literal actor wrapper which includes a literal execution Lambda.

Figure 10:
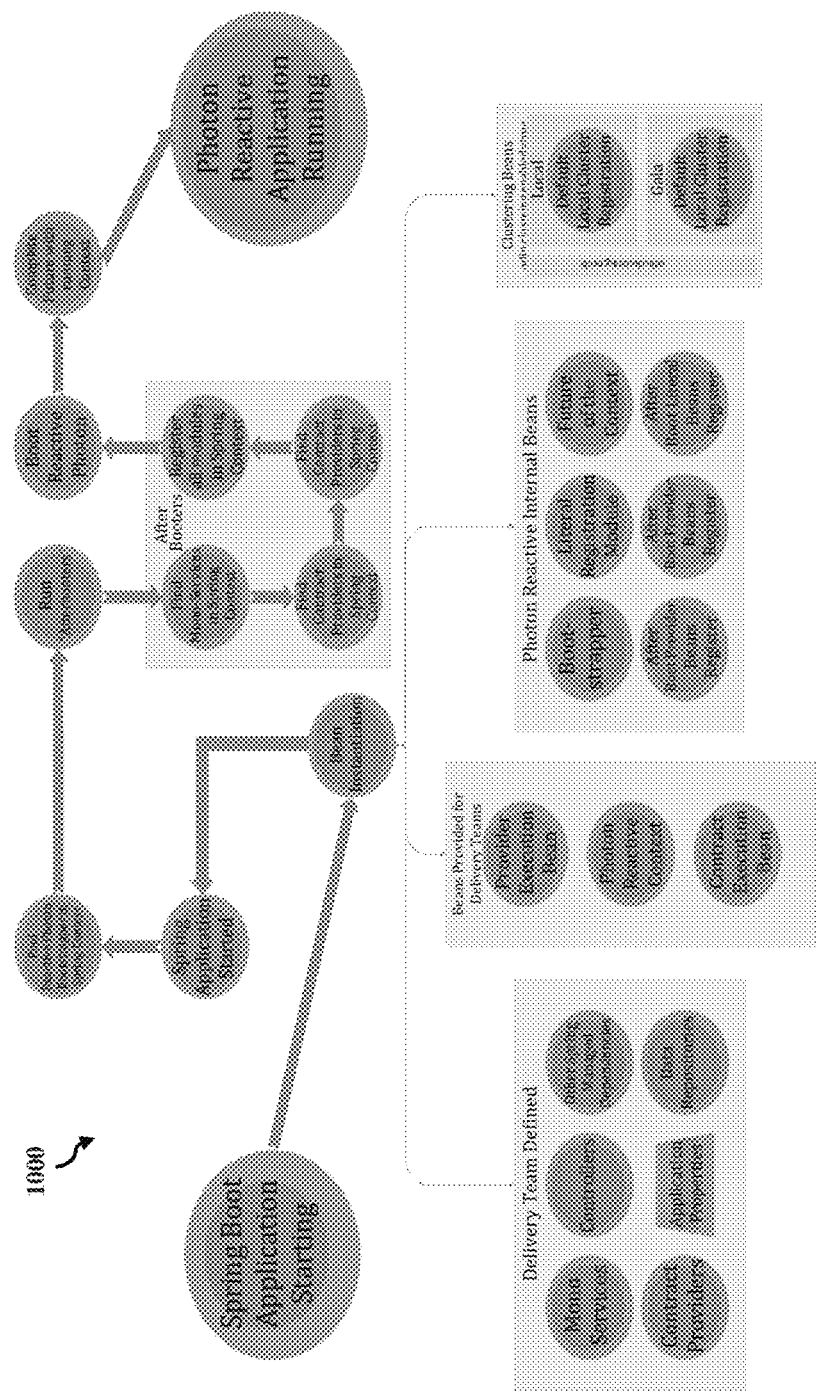
FIG. 10 illustrates a further exemplary embodiment of a process for using the framework, according to an aspect of the present disclosure.

A further exemplary embodiment of a process for using the framework 500 is generally shown at 1000 in FIG. 10.

Accordingly, as illustrated and described by way of the examples herein, the present disclosure provides extremely fast transaction and data stream processing based on configurable, small, easily testable units of code. The transaction and data stream processing may be executed according to rules sourced from a merchant services participant domain and/or contract providers. The embodiments and processes described herein are thin, fast, and location agnostic for speeding up developers ability to deliver business value into a content management system modernization architecture.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory.

Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A non-transitory computer-readable medium including an executable computer program for processing a transaction, the executable computer program, when executed by a processor, causing the processor to perform operations comprising:
   receiving a request to process the transaction, the request including a plurality of pieces of transaction data;
   identifying, based on at least a first piece of the plurality of pieces of transaction data, an initial contract;
   loading the initial contract, the initial contract including a plurality of mono-services;
   executing the initial contract, including the plurality of mono-services; and
   responding to the request to process the transaction based on a result of the executing,
   wherein each of the plurality of mono-services is a function literal that includes a defined input and output, the input includes at least one of the plurality of pieces of transaction data, the plurality of mono-services is configured to return the result, for responding to the request to process the transaction, each of the plurality of mono-services is configured to implement exactly one piece of functionality, the plurality of mono-services is configured to be executed in a predefined order, each of the plurality of mono-services is a Java component, a predefined set of mono-services is defined by the initial contract, with the plurality of mono-services being included in the predefined set of mono-services, and with the predefined set of mono-services being defined by at least one of a type of the initial contract or a contract provider, the request to process the transaction is received from a merchant device, and the result of the executing is transmitted to the merchant device.

2. The non-transitory computer-readable medium according to claim 1, wherein the operations further comprise:

determining, after the executing of the initial contract and before the responding, that at least one additional contract is required for execution;

identifying, based on at least a second piece of the plurality of pieces of transaction data, the at least one additional contract, the at least one additional contract including a second plurality of mono-services; and executing the at least one additional contract, including the second plurality of mono-services, wherein the responding to the request to process the transaction is based on results of the plural executings.

3. The non-transitory computer-readable medium according to claim 1, wherein the initial contract includes the plurality of mono-services as the predefined set.

4. The non-transitory computer-readable medium according to claim 3, wherein independent ones of the plurality of mono-services are configured to execute concurrently.

5. The non-transitory computer-readable medium according to claim 3, wherein the initial contract consists essentially of the plurality of mono-services.

6. The non-transitory computer-readable medium according to claim 3, wherein each of the plurality of mono-services is an actor in an actor system and is addressable.

7. The non-transitory computer-readable medium according to claim 1, wherein the plurality of mono-services is configured to side effect.

8. The non-transitory computer-readable medium according to claim 1, wherein the initial contract is determined based only on the first piece of the plurality of pieces of transaction data.

9. The non-transitory computer-readable medium according to claim 8, wherein the initial contract is loaded based on a second piece of the plurality of pieces of transaction data, the first piece being different than the second piece.

10. The non-transitory computer-readable medium according to claim 9, wherein the first piece of the plurality of pieces of transaction data includes a method of payment, and the second piece of the plurality of pieces of transaction data includes a merchant or a location of the merchant.

11. The non-transitory computer-readable medium according to claim 9, wherein the first piece of the plurality of pieces of transaction data includes a method of payment, and the second piece of the plurality of pieces of transaction data includes an amount of the transaction.

12. The non-transitory computer-readable medium according to claim 1, wherein each of the plurality of mono-services is implemented via functional programming, and the plurality of pieces of transaction data includes a method of payment, a payment number, a merchant, and a location.

13. A system for processing a transaction, the system comprising:

a processor; and a memory storing instructions that, when executed by the processor, cause the processor to perform operations including:

receiving a request to process the transaction, the request including a plurality of pieces of transaction data;

identifying, based on at least a first piece of the plurality of pieces of transaction data, an initial contract;

loading the initial contract, the initial contract including a plurality of mono-services; and executing the initial contract, including the plurality of mono-services; and responding to the request to process the transaction based on a result of the executing, wherein each of the plurality of mono-services is a function literal that includes a defined input and output, the input includes at least one of the plurality of pieces of transaction data, the plurality of mono-services is configured to return the result, for responding to the request to process the transaction, each of the plurality of mono-services is configured to implement exactly one piece of functionality, the plurality of mono-services is configured to be executed in a predefined order, each of the plurality of mono-services is a Java component, a predefined set of mono-services is defined by the initial contract, with the plurality of mono-services being included in the predefined set of mono-services, and with the predefined set of mono-services being defined by at least one of a type of the initial contract or a contract provider, the request to process the transaction is received from a merchant device, and the result of the executing is transmitted to the merchant device.

14. The system according to claim 13, wherein the operations further include:

determining, after the executing of the initial contract and before the responding, that at least one additional contract is required for execution;

identifying, based on at least a second piece of the plurality of pieces of transaction data, the at least one additional contract, the at least one additional contract including a second plurality of mono-services; and executing the at least one additional contract, including the second plurality of mono-services, wherein the responding to the request to process the transaction is based on results of the plural executings.

15. A method for processing a transaction, the method comprising:

receiving a request to process the transaction, the request including a plurality of pieces of transaction data;

identifying, based on at least a first piece of the plurality of pieces of transaction data, an initial contract;

loading the initial contract, the initial contract including a plurality of mono-services;

executing the initial contract, including the plurality of mono-services; and responding to the request to process the transaction based on a result of the executing, wherein each of the plurality of mono-services is a function literal that includes a defined input and output, the input includes at least one of the plurality of pieces of transaction data, the plurality of mono-services is configured to return the result, for responding to the request to process the transaction, each of the plurality of mono-services is configured to implement exactly one piece of functionality, the plurality of mono-services is configured to be executed in a predefined order, each of the plurality of mono-services is a Java component, a predefined set of mono-services is defined by the initial contract, with the plurality of mono-services being included in the predefined set of mono-services, and with the predefined set of mono-services being defined by at least one of a type of the initial contract or a contract provider, the request to process the transaction is received from a merchant device, and the result of the executing is transmitted to the merchant device.

16. The method according to claim 15, further comprising:

determining, after the executing of the initial contract and before the responding, that at least one additional contract is required for execution;

identifying, based on at least a second piece of the plurality of pieces of transaction data, the at least one additional contract, the at least one additional contract including a second plurality of mono-services; and executing the at least one additional contract, including the second plurality of mono-services, wherein the responding to the request to process the transaction is based on results of the plural executings.

* * * * *